(12) United States Patent
Rosene et al.

(10) Patent No.: US 11,001,161 B2
(45) Date of Patent: May 11, 2021

(54) ELECTRIC VEHICLE CHARGING SCHEDULER

(71) Applicant: Ford Global Technologies, LLC, Dearborn, MI (US)

(72) Inventors: Leo Joseph Rosene, La Mesa, CA (US); Ameen Al-Khafaji, Ypsilanti, MI (US); Courtney L'Arrivée, Dearborn Heights, MI (US); Ian Kenneth McEachern, Allen Park, MI (US); Benjamin Schoenleber, Southfield, MI (US); Scott Scheraga, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 16/276,899

(22) Filed: Feb. 15, 2019

(65) Prior Publication Data

US 2020/0262307 A1    Aug. 20, 2020

(51) Int. Cl.
| | |
|---|---|
| *B60L 53/66* | (2019.01) |
| *B60L 11/18* | (2006.01) |
| *G06Q 10/02* | (2012.01) |
| *G06Q 30/06* | (2012.01) |
| *H04M 11/00* | (2006.01) |
| *G05F 5/00* | (2006.01) |
| *H02J 7/00* | (2006.01) |

(Continued)

(52) U.S. Cl.
CPC ............... *B60L 53/66* (2019.02); *B60L 50/50* (2019.02); *B60L 58/12* (2019.02); *G05D 1/0088* (2013.01); *G06F 21/6245* (2013.01); *H04L 67/12* (2013.01); *H04W 4/021* (2013.01); *H04W 4/44* (2018.02); *G05D 2201/0213* (2013.01)

(58) Field of Classification Search
CPC ......... B60L 53/66; B60L 11/18; G06Q 10/02; G06Q 30/06; H04M 11/00; G05F 5/00; H02J 7/00
See application file for complete search history.

(56) References Cited

U.S. PATENT DOCUMENTS 5,892,346 A * 4/1999 Moroto ................. B60W 10/08
318/587
8,639,214 B1 * 1/2014 Fujisaki ............... H04M 11/007
455/406

(Continued)

FOREIGN PATENT DOCUMENTS

CN          103793758 A     5/2014

OTHER PUBLICATIONS

Li, et al, "Optimal allocation of charging facilities for electric vehicles based on queuing theory," Automation of Electric Power Systems, Jul. 25, 2011, vol. 35, No. 14, pp. 58-61, Guangxi University, China, 4 Pages (incl. English abstract).

*Primary Examiner* — Yuri Kan
(74) *Attorney, Agent, or Firm* — Gregory P Brown; Brooks Kushman PC (57) ABSTRACT

A vehicle includes one or more controllers, programmed to responsive to receiving an indication of a destination, select a charger within a predefined geofence from the destination; responsive to detecting the vehicle becoming less than a predefined distance from the charger, calculate a proposed charging schedule based on a current state-of-charge (SOC) and a desired SOC; and join a queue for the charger with the proposed charging schedule.

20 Claims, 7 Drawing Sheets

(51) Int. Cl.

| | | |
|---|---|---|
| *G06F 21/62* | (2013.01) | |
| *B60L 58/12* | (2019.01) | |
| *B60L 50/50* | (2019.01) | |
| *H04W 4/021* | (2018.01) | |
| *H04L 29/08* | (2006.01) | |
| *H04W 4/44* | (2018.01) | |
| *G05D 1/00* | (2006.01) | |

(56) References Cited

U.S. PATENT DOCUMENTS

| | | |
|---|---|---|
| 8,725,306 B2 | 5/2014 | Ramezani et al. |
| 9,142,978 B2 | 9/2015 | Juhasz |
| 9,283,856 B2 | 3/2016 | Huntzicker et al. |
| 9,387,772 B2 | 7/2016 | Usuki et al. |
| 9,805,519 B2 | 10/2017 | Ramanujam |
| 2012/0245750 A1* | 9/2012 | Paul .................. G06Q 50/06 |
| | | 700/291 |
| 2014/0257884 A1 | 9/2014 | Kyoung |
| 2015/0149221 A1 | 5/2015 | Tremblay |
| 2015/0306969 A1* | 10/2015 | Sabripour ............ G06Q 30/00 |
| | | 320/109 |
| 2018/0253788 A1* | 9/2018 | Takatsuka ........... G06Q 30/06 |
| 2020/0219019 A1* | 7/2020 | Choi ................... B60L 53/63 |

* cited by examiner

ELECTRIC VEHICLE CHARGING SCHEDULER

TECHNICAL FIELD

The present disclosure is generally related to a vehicle fueling system. More specifically, the present disclosure is related to a system for charging electric-powered vehicles.

BACKGROUND

Electric-powered vehicles such as hybrid vehicles or battery electric vehicles (BEVs) refuel by charging electricity to a traction battery via charging infrastructure such as charging stations. Depending on the specific configuration of a charging station and vehicle battery, it may take hours even days to complete a charging process. When the charging infrastructure is limited as compared to the number of the electric-power vehicles, it may be difficult to schedule the charging for each vehicle efficiently. For instance, there may be vehicles finished charging but still occupying the charging station, while other vehicles waiting in the line cannot use the charging station because there is no vacancy.

SUMMARY

In one or more illustrative embodiment of the present disclosure, a vehicle includes one or more controllers, programmed to responsive to receiving an indication of a destination, select a charger within a predefined geofence from the destination; responsive to detecting the vehicle becoming less than a predefined distance from the charger, calculate a proposed charging schedule based on a current state-of-charge (SOC) and a desired SOC; and join a queue for the charger with the proposed charging schedule.

In one or more illustrative embodiment of the present disclosure, a device in communication with a vehicle includes a processor, programmed to responsive to receiving a trip destination, select a charging station within a predefined distance from the trip destination; calculate a proposed charging schedule based on a current battery SOC, a desired battery SOC, an estimated departure time, and a charging rate of the charging station; and responsive to receiving input from a user indicative of the proposed charging schedule is acceptable, send the proposed charging schedule via a cloud server to the vehicle and the charging station to join a queue for the charging station.

In one or more illustrative embodiment of the present disclosure, a charging scheduling device associated with a charging station includes a controller, programmed to responsive to detecting a vehicle joining a queue for the charging station, generate a charging schedule for the vehicle based on user-specific parameters of a vehicle user; verify if the charging station can accommodate the charging schedule without displacing other vehicles already in the queue; and responsive to verifying the charging station can accommodate the charging schedule, send an open charger notification to a mobile device associated with the vehicle user.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a charging system for electric-powered vehicles. More specifically, the present disclosure proposes a charging station scheduling system.

Figure 1:
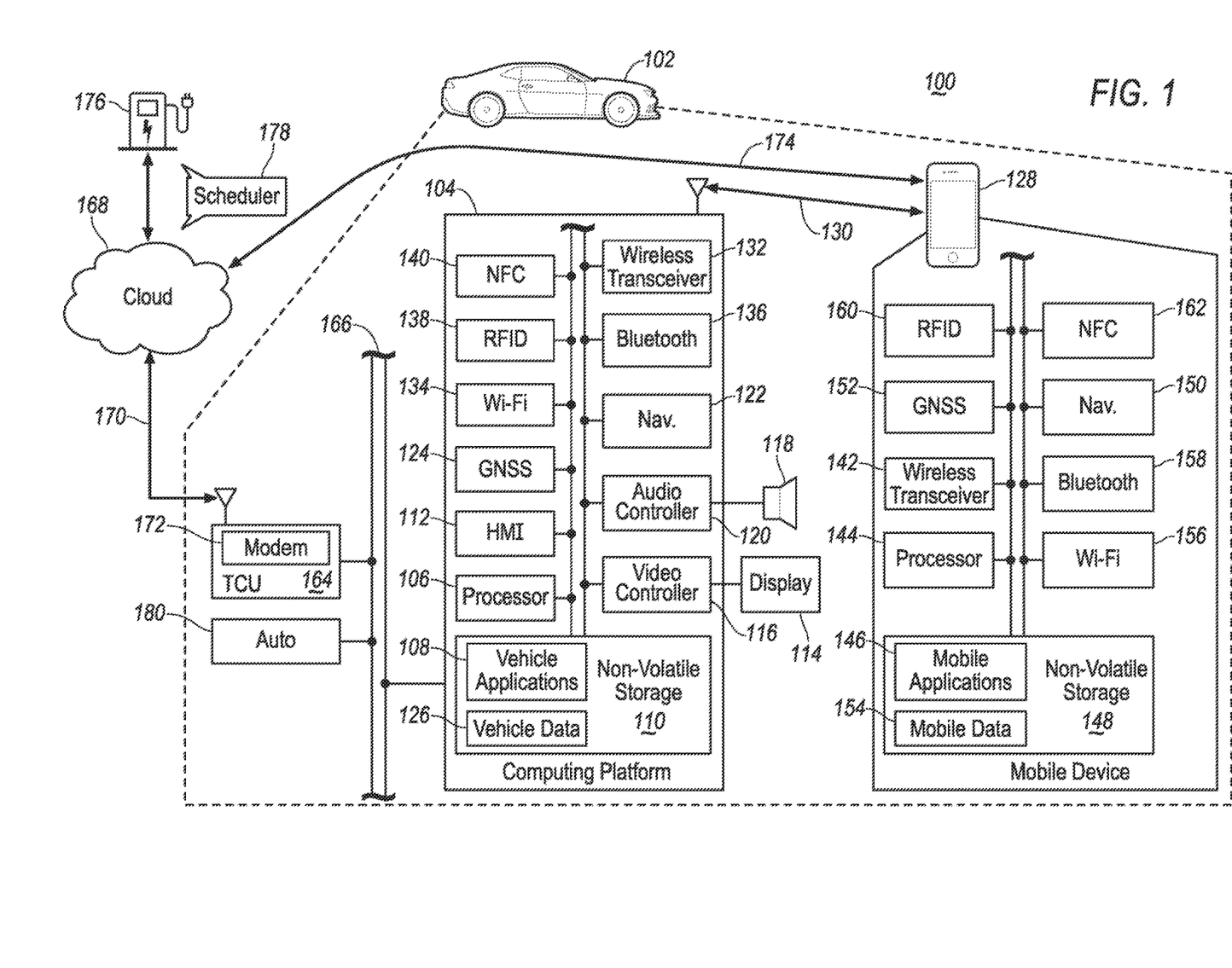
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be BEV, a hybrid electric vehicle (HEV)

powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, charging scheduling, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to execute instructions of mobile applications 146 to perform instructions, commands, and other routines in support of the processes such as navigation, telephone, wireless communication, and multi-media processing. The mobile applications may be stored in a non-volatile storage medium 148 of the mobile device 128. For instance, the mobile device 128 may be provided with location and navigation functions via a navigation controller 150 and a GNSS controller 152. Map data needed for navigation may be stored in the storage 148 as a part of mobile data 154. The mobile device 128 may be provided with a wireless transceiver 142 in communication with a Wi-Fi controller 156, a Bluetooth controller 158, a RFID controller 160, a NFC controller 162, and other controllers (not shown), configured to communicate with the wireless transceiver 132 of the computing platform 104.

The computing platform 104 may be further configured to communicate with a telematics control unit (TCU) 164 via one or more in-vehicle network 166. The in-vehicle network 166 may include, but is not limited to, one or more of a controller area network (CAN), an Ethernet network, and a media-oriented system transport (MOST), as some examples.

The TCU 164 may be configured to control telecommunication between vehicle 102 and a cloud 168 through a wireless connection 170 using a modem 172. The term cloud is used as a general term in the present disclosure and may include any computing network involving computers, servers, controllers or the like configured to perform data processing functions and facilitate communication between various parties. The wireless connection 170 may involve or utilize any type of wireless network such as a cellular network enabling the communication between the computing platform 104 and the cloud 168 as well as other parties. The mobile device 128 may be further provided telecommunication features configured to communicate with the cloud 168 via a wireless connection 174 via telecommunication components such as a modem (not shown). In this way, the mobile device 128 may be configured to communicate with the computing platform 104 of the vehicle 102 via the cloud 168 in addition to or in lieu of the wireless connection 130. The TCU 164 and/or the mobile device 128 may be further configured to communicate with a charging station 176 via the cloud 168. The charging station 176 may be configured to charge a traction battery (not shown) of the vehicle 102. The charging station 176 may be provided with a scheduler 178 implemented with a controller or computer (not shown) having processing capabilities configured to perform charging schedules for the vehicle 102. Alternatively, the charging station scheduler 178 may be implemented remotely at the cloud 168 in communication with the charging station 176.

The vehicle 102 may be further provided with an autonomous driving controller 180 configured to operate the vehicle 102 in an autonomous manner with or without human involvement. The autonomous driving controller 180 may be in communication with the GNSS controller 124, the navigation controller 122 and various sensors/cameras (not shown) of the vehicle 102 and configured to generate driving instructions to operate the vehicle 102 to a predefined location. Additionally, the autonomous driving controller 180 may be further configured to communicate with the cloud and receive commands and instructions therefrom to perform the autonomous driving features.

Figure 2:
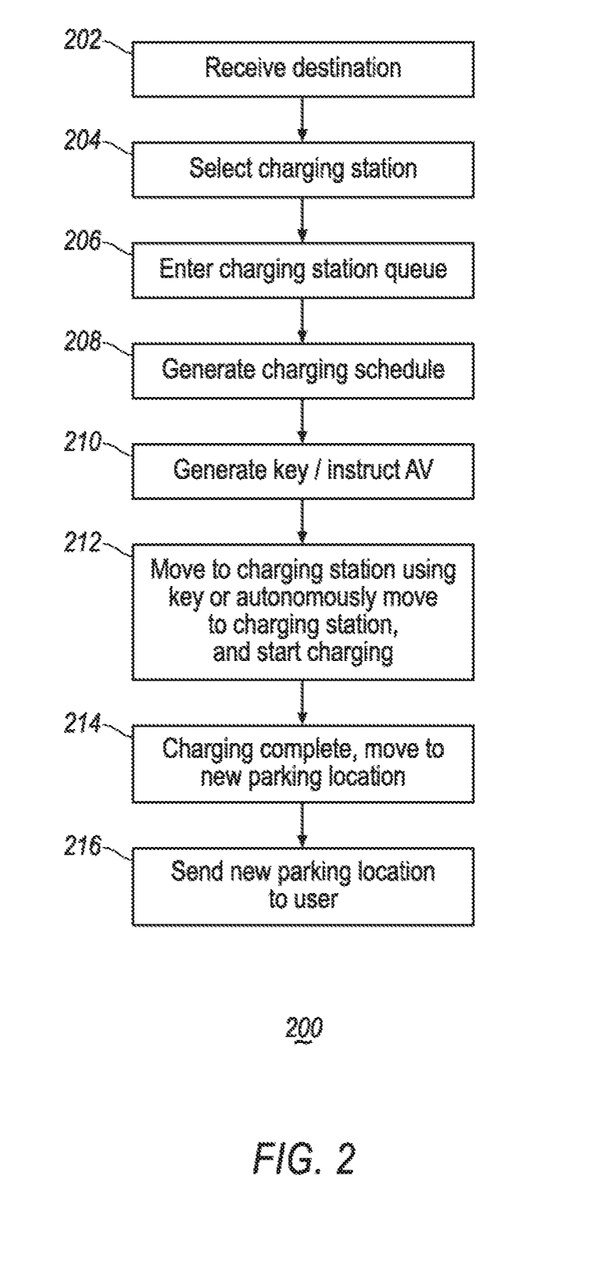
FIG. 2 illustrates an example flow diagram of the vehicle charging system of one embodiment of the present disclosure.

Referring to FIG. 2, an example flow diagram for a process 200 of one embodiment of the present disclosure is illustrated. The process 200 may be implemented using various devices such as the mobile device 128, the computing platform 104, a computer (not shown) having access to the cloud 168 and/or any combination thereof. For the simplicity of the illustration, the process 200 will be described primarily with reference to the mobile device 128. At operation 202, the mobile device 128 receives a trip destination for the vehicle 102 via software as one of the mobile applications 146. The trip destination may be manually input to the mobile device 128 via an interface (not shown). Alternatively, the destination may be generated or collected from other sources. For instance, the software 146 of the mobile device 128 may be configured to collect historic route and destination of the vehicle 102 to calculate and predict trip destinations of the vehicle 102 at a given time and day of the week. Responsive to receiving/determining the trip destination, at operation 204, the mobile device 128 selects a charging station 176 near the destination. The mobile software 146 may be configured to display charging stations 176 in the order of closest to the destination and let the user to manually select one or more charging stations 176. Alternatively, the mobile software 176 may be configured to automatically select the charging stations 176 using predefined rules such as by distance from the destination or by preconfigured user preferences.

Responsive to selecting the charging station 176 for the vehicle 102, at operation 206, the mobile device 128 enters the charging station queue for the selected charging station, and generate a charging schedule for the vehicle 102 at operation 208. The charging schedule may include information about a charge starting time, charge finishing time, charging specification (e.g. charging method/connector, charging current or the like). Alternatively, the charging schedule may be generated by the scheduler 178 through communication with the mobile device 128. The charging schedule may indicate the starting and finishing time of the charging. The charging schedule may be generated based on various factors such as an estimated departure time manually input by the user or calculated by the mobile software, an estimated battery state of charge (SOC) or the like. Responsive to generating the charging schedule, at operation 210, the mobile device 128 generates a key based on the charging schedule allowing a third party to access the vehicle to proceed with the charging. The third party may be an authorized valet driver associated with the selected charging station 176 assigned for the vehicle 102 to pick up the vehicle using the key to drive to the charging station 176 and charge the vehicle 102. The key may be a digital authorization, e.g., a phone-as-a-key (PaaK), within a specific time period and/or geofence allowing the third party to operate the vehicle 102. Additionally or alternatively, in case that the vehicle 102 is provided with autonomous driver features, the mobile device 128 may generate driving instructions for the autonomous driving controller 180 to operate the vehicle 102 to the selected charging station 176. The driving instructions may be sent to the vehicle 102 via the wireless connection 130 or via the cloud 170.

At operation 212, the vehicle 102 is accessed by the third party using the key and moved to the charging station 176 to start charging. Alternatively, in case of an autonomous vehicle, the autonomous driving controller 180 may operate the vehicle 102 to the charging station 176 using the instructions received. At operation 214, the vehicle 102 is moved to a new parking location via the key or the autonomous driving controller 180 responsive to completing the scheduled charging. Depending of the charging schedule previously generated, the battery of the vehicle 102 may not be fully charged when the charging schedule is completed. At operation 216, the computing platform 104 sends the new parking location of the vehicle 102 to the mobile device 128 allowing the user to pick up the vehicle 102.

Figure 3:
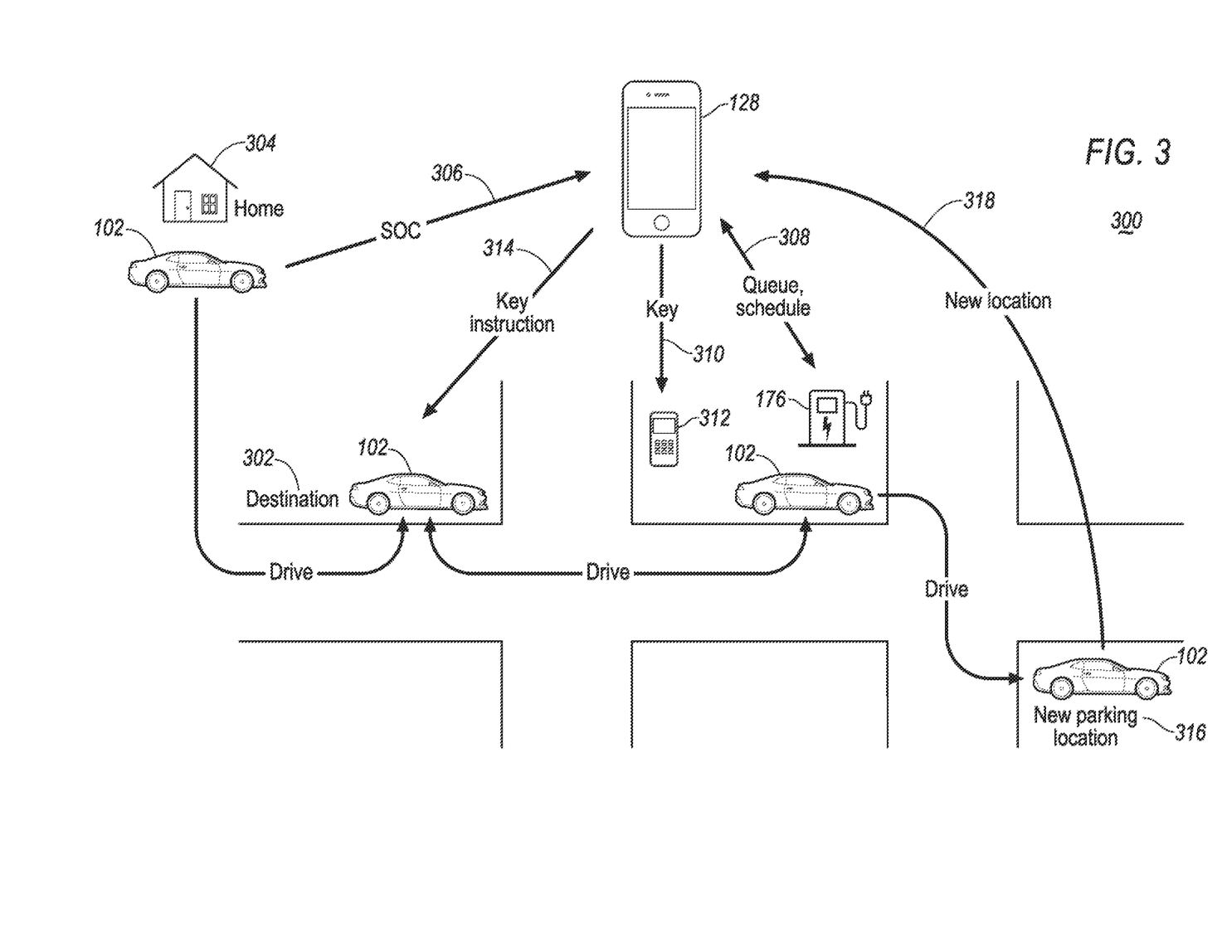
FIG. 3 illustrates an example schematic diagram of the vehicle charging system of one embodiment of the present disclosure.

Referring to FIG. 3, an example schematic diagram 300 of one embodiment of the present disclosure is illustrated. With continuing reference to FIGS. 1 and 2, a trip destination 302 for the vehicle 102 may be input to or collected by the mobile device 128. The mobile device 128 may be configured to allow the user to select the charging station 176 near the trip destination 302 to charge the vehicle 102. Next, the mobile device 128 may communicate with the charging station 176 (e.g. via the cloud 168) to join the vehicle 102 to the queue and obtain the current queue status and schedules of the charging station 176. The mobile device 128 may further calculate the charging schedule for the vehicle 102 based on various factors and determine if the charging schedule for the vehicle 102 fits into the schedule of the charging station 176. For instance, the charging schedule for the vehicle 102 may be calculated based on factors including current battery SOC, desired battery SOC, estimated pickup time or the like. The mobile device 128 may be further configured to access a schedule such as a calendar, text message or email of the user to determine the desired battery SOC after the charge. For instance, the user of the vehicle 102 may be scheduled to drive from home 304 to work destination 302 ten miles away in the morning. The user is further scheduled to attend a dinner in a restaurant fifty miles away in the evening after work and drive sixty miles back home after dinner. In other words, the vehicle 102 will need a desired SOC at least for one hundred ten miles (i.e. fifty plus sixty mile) for the evening driving. The mobile device 128 may receive the current SOC of the vehicle 102 before the trip at operation 306 and obtain the user schedule to calculate the total estimated driving distance for the vehicle 102 of the day. With the total estimated driving distance, the mobile device 128 may calculate the charge required and therefore the time period required to charge the vehicle 102. Next the mobile device 128 may determine if the time period will fit into the schedule of the charging station 176. Alternatively, the charging schedule may be generated and coordinated via the scheduler 178 in addition to or in lieu of the mobile device.

If the schedule does not fit in, the mobile device 128 may look elsewhere and switch to other nearby charging station (not shown). Otherwise, if the charging station 176 can accommodate the charging requirement of the vehicle 102, the mobile device 128 may send the charging schedule to the charging station 176 to put a reservation at 308. Next, at 310, the mobile device 128 may generate a digital key and send the digital key to a digital entity 312 of a third party associated with the charging station 176 giving permission to the third party to access to vehicle 102. The mobile device 128 may further send the key to the vehicle 102 at 314. The digital key may be a valet key which only grant the third party with limited access to the vehicle features. For instance, the key does not allow the third party to access any private data (e.g. previous destinations) of the vehicle 102. Additionally, the digital key may be limited in terms of location and time. The third party may not be allowed to operate the vehicle 102 outside the permitted geofence or time period. Alternatively, if the vehicle 102 is provided autonomous driving features, driving instructions may be sent to the vehicle 102 in lieu of the key.

Having obtained the key to access the vehicle 102, the third party may come to the destination 302 to move the vehicle 102 to the charging station 176 and start charging as scheduled. Alternatively, the vehicle 102 may autonomously drive to the charging station 176 using the driving instructions. Responsive to complete the charging as scheduled, the vehicle 102 may vacate the charging station 176 and move to a new parking location 316 to wait for pick up by the user. The new parking location 316 may be sent to the mobile device 128 at 318.

Figure 4:
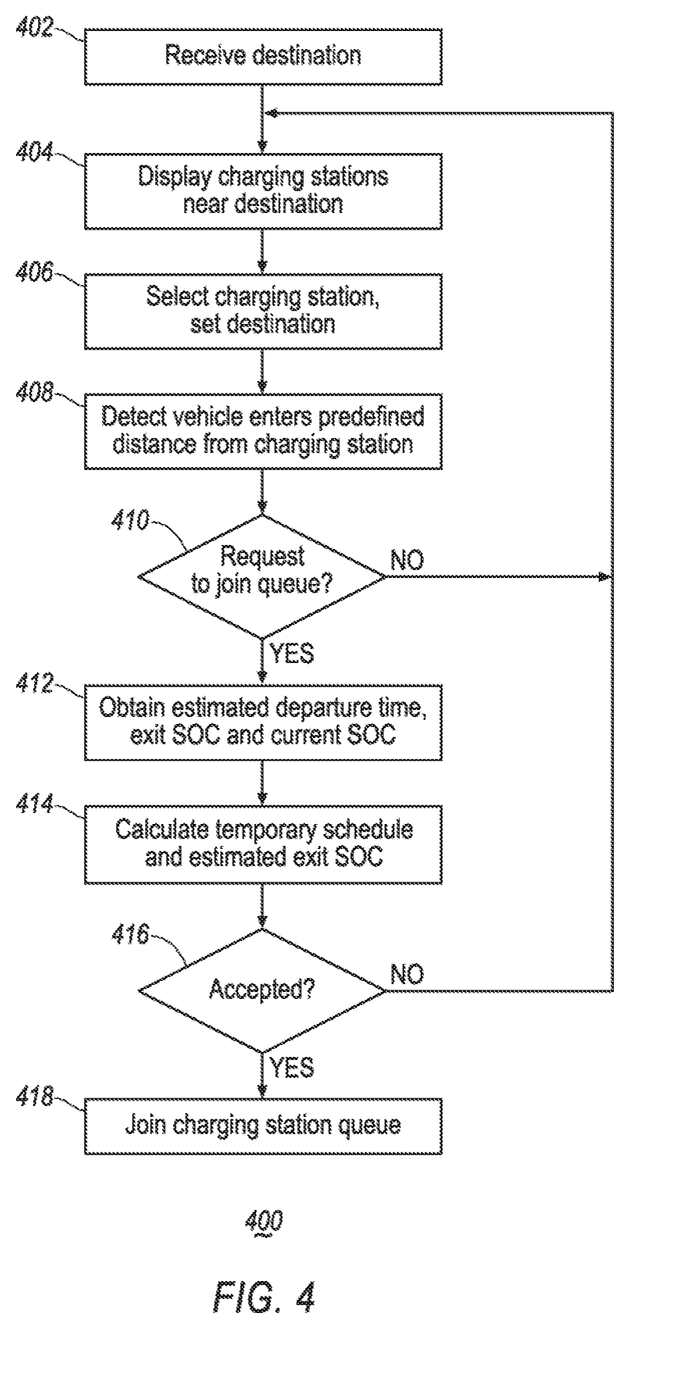
FIG. 4 illustrates an example flow diagram for a process for selecting charging stations of one embodiment of the present disclosure.

Referring to FIG. 4, a flow diagram for a charging station selecting process 400 of one embodiment of the present disclosure is illustrated. The process 400 generally corresponds to operations 202 to 206 of the process 200 illustrated with reference to FIG. 2, although some details may vary depending on specific implementations. Similarly, the process 400 may be implemented using various devices such as the mobile device 128, the computing platform 104, or any combination thereof. For the simplicity of the illustration, the process 400 will be described primarily with reference to the computing platform 104 of the vehicle 102. At operation 402, the computing platform 104 receives a trip destination via user input e.g. through the HMI controller 112. Alternatively, an estimated destination may be generated by the computing platform 104 based on information from other sources such as historic routes and destinations of the vehicle 102 at a given time and day of the week. Alternatively, the computing platform 104 may be granted access to personal data of the user e.g. calendar, email, or the like, and determine the estimated destination using the personal data.

At operation 404, the computing platform 104 outputs options for charging station within a predefined distance or geofence from the destination e.g. via the display 114. The charging stations may be presented in a list in the order of closest to the destination or alternatively on a map allowing the user to select a desired charging station 176 from the options. At operation 406, the computing platform 104 selects the desired charging station 176 from the list or on the map displayed on the display 114 responsive to a user input and sets the desired charging station 176 as the trip destination. Alternatively, the computing platform 104 may be configured to automatically select the desired charging station 176 based on predefined user preferences/configurations (e.g. historic charging location selections) without receiving the user input.

As the vehicle 102 traverses the route, at operation 408, the computing platform 104 detects the vehicle has entered a predefined distance (e.g. one mile) from the charging station 176. In response to such detection, at operation 410, the computing platform 104 askes for input from the user to confirm that he/she still wants to use the selected charging station 176 and join the queue. The user input may be made via the HMI controls 112 or via the display 114 provided with touch screen capabilities. Additionally or alternatively, the user input may be received via a voice command through a microphone (not shown) by way of the audio controller 120. Additionally or alternatively, the user input may be received via the mobile device 128 in communication with the computing platform 104 via the wireless connection 130. If the user input indicates he/she no longer intends to use the selected charging station 176, the process returns to operation 404 to allow the user to reselect a new charging station. Otherwise, if the user input confirms the selected charging station 176, the process proceeds to operation 412.

At operation 412, the computing platform 104 obtain an estimated departure time, a desired exit SOC and the current SOC of the battery of the vehicle 102. The current battery SOC may be obtained from the battery or a battery controller (not shown). The departure time and desired exit SOC may be manually entered by the user or alternatively obtained from other sources such as historic departure records, calendar, text message, email, or the like. With the information obtained at operation 412 combined with the specification of the charging station 176 such as charging power/current capability (as different charging stations may have different specifications), the computing platform 104 calculates a temporary charging schedule and an estimated exit SOC. The estimated SOC may be substantially the same as the desired exit SOC, and the temporary charging schedule may include the time required to reach the desired exit SOC. At operation 416, the computing platform 104 verifies if the temporary charging schedule is acceptable for the vehicle 102. The verification may be performed automatically by the computing platform 104 or manually through user input. If the temporary schedule is not accepted, the process returns to operation 404 to reselect a new charging station. Otherwise, the process proceeds to operation 418 to join the queue for the charging station 176.

Figure 5A:
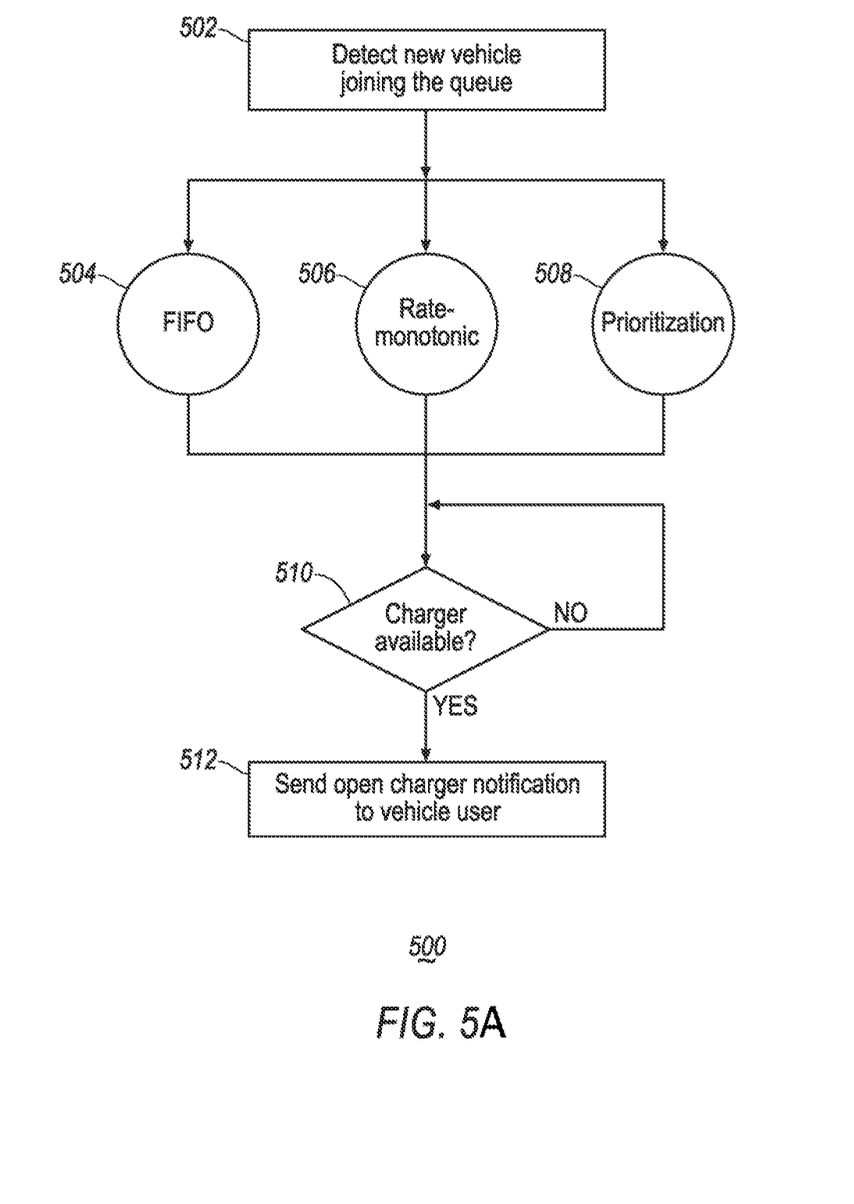
FIGS. 5A and 5B illustrate an example flow diagram for a process for charging station scheduling of one embodiment of the present disclosure.
Figure 5B:
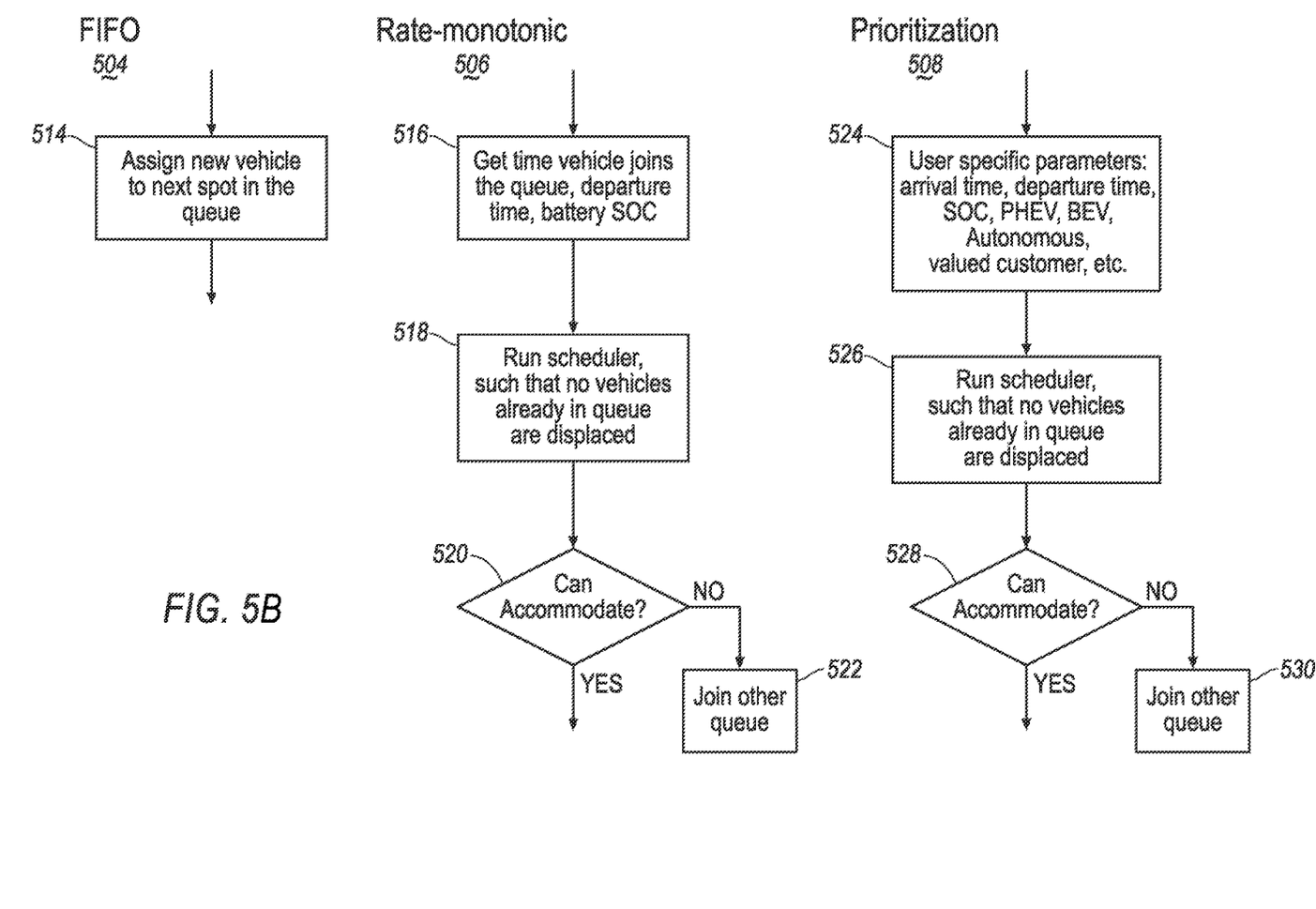

Referring to FIG. 5, a process 500 for charging station scheduling of one embodiment of the present disclosure is illustrated. The process 500 generally corresponds to operation 208 as illustrated with reference to FIG. 2, and detailed operations of the charging station scheduling process 500 will be given here. The process 500 may performed via a charging station scheduler 178, which may be implemented via a controller, having processing capabilities associated with the charging station 176. Alternatively, the scheduler 178 may be implemented via the cloud 168 associated with the charging station 176. At operation 502, the scheduler 178 receives a request from the vehicle 102 to join the queue for the charging station 176. In response, the scheduler 178 processes the request using predefined algorithms. As an example, the scheduler 178 may be configured to schedule the charging using one or more of a first-in-first-out (FIFO) method 504, a rate-monotonic method 506, or a prioritization method 508.

The FIFO method 504 is illustrated with reference to operation 514, where the scheduler 178 assigns the vehicle 102 to the next spot in the queue, behind those vehicles already in the queue. Next, at operation 510, when a charger at the charging station 176 becomes available, at operation 512, the scheduler 178 sends an open charger notification to the user of the vehicle 102 to invite the user to issue a digital key allowing access to the vehicle 102. Additionally or alternatively, the notification may be sent to the vehicle 102 directly. In case that the vehicle 102 is provided autonomous driving features, the notification may further include information about the charging schedule such as time and location confirmed by the scheduler 178 to allow the vehicle 102 to drive to the charging station 176 autonomously.

In case that the rate-monotonic method 506 is used, at operation 516, the scheduler 178 obtains information such as the time the vehicle 102 joins the queue, estimated departure time, current SOC, desired exit SOC to calculate an estimated charging time for the vehicle 102. Operation 516 is similar to operation 414 illustrated with reference to FIG. 4. Therefore, the scheduler 178 may be alternatively configured to obtain the temporary schedule from the computing platform 104 in addition to or in lieu of its own calculation. At operation 518, the scheduler 178 loads the current schedule for the charging station 176 to determine if the charging station 176 can accommodate the charging requirement of the vehicle 102 without displacing vehicles already in the queue. If the answer is a no and the charging requirement for the vehicle 102 cannot be accommodated by the charging station 176, the process proceeds from operation 520 to operation 522 and the scheduler 178 notify the vehicle 102 to join another queue. Otherwise, the process proceed to operation 510 as previously discusses.

In case that the prioritization method 508 is used, at operation 524, the scheduler 178 generates a customized charging schedule for the vehicle 102 using various user specific parameters. For instance, the user specific parameters may include estimated arrival time, estimated departure time, current SOC, desired exit SOC, vehicle type (e.g. BEVs may be given priority over PHEVs as electricity is the only energy source for BEVs), autonomous features, valued customer status, user calendar events/locations or the like. With the customized charging schedule of the vehicle 102, at operation 526, the scheduler 178 determines if the charging station 176 can accommodate the vehicle 102. As an example, each user may be assigned with a charging priority level based on his/her current SOC and/or the price he/she offers to pay. For instance, a vehicle with above 90% SOC may be automatically assigned with a low priority level, whereas a vehicle with less than 30% SOC may be automatically assigned with a higher priority level. Additionally, a vehicle user may be subscribed to different charging plans with different priorities. A premium charging plan with higher fee may grant the user with higher priority level regardless of the current SOC level. The premium charging plan may further allow the user to override his priority level based on the current SOC. Therefore, the scheduler 178 may be configured to re-order the queue as needed based on the user priority level to accommodate the vehicle 102 by removing users with low priority levels from the queue. The low priority plan level user would have to know that they may be removed based on their plan. Operations 526 to 530 are substantially the same as operations 518 to 522 previously discussed and will not be described again here for simplicity purposes.

Alternatively, at operation 502, the scheduler 178 may further receive a temporary charging schedule generated by the vehicle 102 or by the mobile device 128. In this case, the scheduler 178 may be configured to verify of the charging station 176 can accommodate the temporary charging schedule. The scheduler 178 may approve the temporary charging schedule if it is determined that the charging station 176 can accommodate the temporary charging schedule. Otherwise, the scheduler 178 may be further configured to modify the temporary charging schedule based on the above method using various data to generate a new charging schedule.

Figure 6:
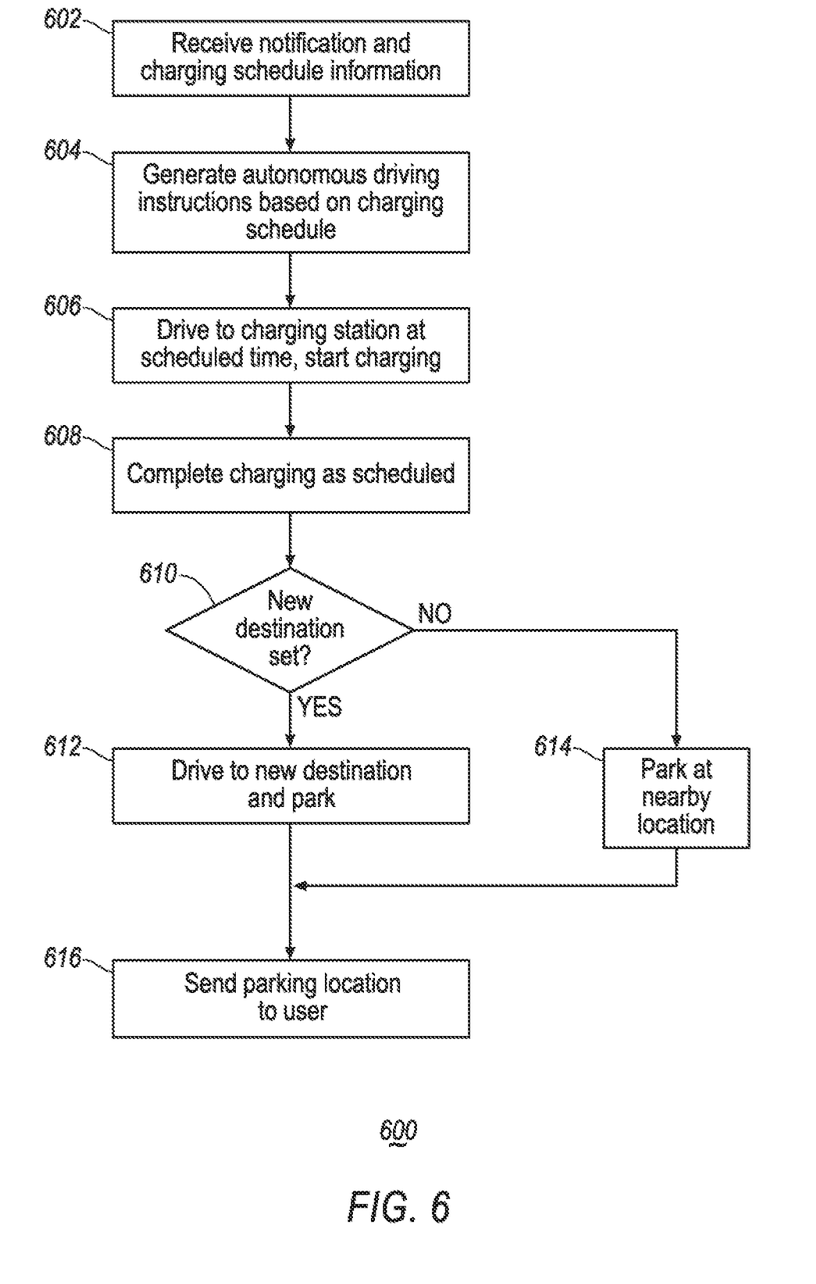
FIG. 6 illustrates an example flow diagram for a process for charging the vehicle of one embodiment of the present disclosure.

Referring to FIG. 6, an example flow diagram for a process 600 for charging the vehicle of one embodiment of the present disclosure is illustrated. The process 600 is applied to vehicles with autonomous driving features. At operation 602, the computing platform 104 of the vehicle 102 receives the notification from the charging station scheduler 178 via the TCU 164 indicating the charging station 176 can accommodate the vehicle 102. Additionally, the computing platform 104 further receives information about the charging schedule such as the location of the charging station 176, scheduled time to arrive or the like. At operation 604, the autonomous driving controller 180 of the vehicle 102 generates autonomous driving instructions based on the charging schedule information, and direct the vehicle 102 to drive to the charging station 176 at the scheduled time at operation 606. Once arrived, a human operator associated with the charging station 176 may connect a charging cable to the vehicle 102 to start to charge. Alternatively, in case that the charging station 176 is equipped with automatic charger facilities, the vehicle 102 may be configured to interact with the automatic charger and start charging automatically without human involvement.

The traction battery of the vehicle 102 may be of a large capacity and it may take hours to fully charge the battery depending of the current SOC and specification of the charging station 176. The charging may complete when the battery is fully charged. Alternatively, the charging may complete at a scheduled time or battery level reaches the desired SOC according to the charging schedule accommodated by the charging station 176. At operation 608, the vehicle 102 completes the charging and disconnects from the charger.

At operation 610, the computing platform 104 checks if there is a new destination set allowing the user to pick up the vehicle 102. If the answer is a yes, the computing platform 104 sets the new location as the destination via the navigation controller 122 and the autonomous driving controller 180 operates the vehicle 102 to the destination and parks the vehicle at an available parking space within or near the new destination at operation 612. If no pickup destination is set, the process proceeds to operation 614 and the autonomous driving controller 180 vacate the vehicle 102 from the charging station 176 and parks the vehicle 102 at a nearby available parking space. At operation 616, the computing platform 104 sends the new parking location to the user via the TCU 164 allowing the user to pick up the vehicle 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
one or more controllers, programmed to
responsive to receiving an indication of a destination, select a charger within a predefined geofence from the destination;
responsive to detecting the vehicle becoming less than a predefined distance from the charger, calculate a proposed charging schedule based on a current state-of-charge (SOC) and a desired SOC; and
join a queue for the charger with the proposed charging schedule.

2. The vehicle of claim 1, wherein the desired SOC is obtained using personal data of a user indicative of an estimated future driving activity.

3. The vehicle of claim 1, wherein the one or more controllers are further programmed to:
receive an approval notification and an approved charging schedule from a cloud server.

4. The vehicle of claim 3, wherein the one or more controllers are further programmed to:
generate a digital key configured to allow a third party to access the vehicle; and
send the digital key to the third party via the cloud server.

5. The vehicle of claim 4, wherein the digital key is configured to allow the third party to access the vehicle limited to a predefined area and a predefined time period.

6. The vehicle of claim 5, wherein the digital key is further configured to grant limited access to data stored to the vehicle, and prohibit access to any of the data preconfigured to be private.

7. The vehicle of claim 3, wherein the one or more controllers are further programmed to:
generate autonomous driving instructions based on the approved charging schedule; and
operate the vehicle to the charger via the autonomous driving instructions.

8. The vehicle of claim 7, wherein the one or more controllers are further programmed to:
responsive to detecting the charging has completed, operate the vehicle to a predefined pickup location; and
park the vehicle at an available parking space at the predefined pickup location.

9. The vehicle of claim 8, wherein the one or more controllers are further programmed to:
responsive to parking the vehicle, sending a current location of the vehicle to a user via the cloud server.

10. A device, in communication with a vehicle, comprising:
a processor, programmed to
responsive to receiving a trip destination, select a charging station within a predefined distance from the trip destination;
calculate a proposed charging schedule based on a current battery SOC, a desired battery SOC, an estimated departure time, and a charging rate of the charging station; and
responsive to receiving input from a user indicative of the proposed charging schedule is acceptable, send the proposed charging schedule via a cloud server to the vehicle and the charging station to join a queue for the charging station.

11. The device of claim 10, wherein the estimated departure time and the desired battery SOC is obtained using at least one of: personal data of a user indicative of an estimated future driving activity, or historic personal data of the user,
the personal data of the user include at least one of: calendar data, email data, or text message data, and
the historic personal data of the user include at least one of: past navigation record, or historic vehicle location data.

12. The device of claim 10, wherein the processor is further programmed to:
responsive to receiving an approved charging schedule from the cloud, generate a digital key configured to allow a third party to access the vehicle;
send the digital key to the vehicle via one of: the cloud server or a wireless connection between the device and the vehicle; and
send the digital key to the third party via the cloud.

13. The device of claim 12, wherein the wireless connection between the device and the vehicle involves at least one of the following technologies: Wi-Fi, Bluetooth, radio-frequency identification (RFID), or near-field communication (NFC).

14. The device of claim 12, wherein the digital key is configured to allow the third party to access the vehicle limited to a predefined area and a predefined time period.

15. The device of claim 10, wherein the processor is further programmed to:
responsive to receiving an approved charging schedule from the cloud, generate an autonomous driving command for the vehicle configured to direct the vehicle to autonomously operate to the charging station at a predefined time; and
send the autonomous driving command to the vehicle.

16. A charging system comprising:
a plurality of vehicles; and
charging scheduling device, associated with a charging station,
a first vehicle of the plurality of vehicles that includes a vehicle controller, programmed to:
responsive to receiving an indication of a destination, select a charging station within a predefined geofence from the destination, responsive to detecting the first vehicle becoming less than a predefined distance from the charging station, user-specific parameters including a current state-of-charge (SOC) and a desired SOC, and
join a queue for the charging station with the user-specific parameters; and
the charging scheduling device that includes a scheduling controller, programmed to:
responsive to detecting the first vehicle joining a queue for the charging station, generate a charging schedule for the first vehicle based on user-specific parameters of a vehicle; user,
verify if the charging station can accommodate the charging schedule based on a charging priority level assigned to the first vehicle, and
responsive to verifying the charging station can accommodate the charging schedule, send an open charger notification to a mobile device associated with the vehicle user.

17. The charging scheduling device of claim 16, wherein the user-specific parameters further include at least one of: arrival time, departure time, vehicle type, autonomous features, or customer values.

18. The charging scheduling device of claim 16, wherein the scheduling controller is further programmed to:
receive a temporary charging schedule from the mobile device; and
verify if charging station can accommodate the temporary charging schedule.

19. The charging scheduling device of claim 18, wherein the scheduling controller is further programmed to:
modify the temporary charging schedule based on the user specific parameters to generate an approved charging schedule.

20. The charging scheduling device of claim 16, wherein the scheduling controller is further programmed to:
accommodate the charging schedule of the first vehicle by removing a second vehicle with a lower priority compared with the charging priority level of the first vehicle from the queue.

* * * * *